United States Patent Office 3,851,086
Patented Nov. 26, 1974

3,851,086
DEFLUORINATED PHOSPHATE FEED SUPPLEMENT PRODUCTION
Arthur N. Baumann, Lakeland, Fla., assignor to International Minerals & Chemical Corporation
No Drawing. Filed Apr. 5, 1972, Ser. No. 241,439
Int. Cl. A23k 1/175
U.S. Cl. 426—381     11 Claims

ABSTRACT OF THE DISCLOSURE

An animal feed ingredient is produced from a phosphatic material, which may be either triple superphosphate or a combination of phosphate rock and phosphoric acid, by mixing the same with sodium hydroxide and calcium carbonate in amounts such that the $CaO/P_2O_5$ mole ratio is in the range of from about 2.20 to about 2.25 and the $Na_2O/P_2O_5$ mole ratio is in the range of from about 0.65 to about 0.70, and calcining the mixture at a temperature of at least about 2250° F.

BACKGROUND OF THE INVENTION

This invention relates to the preparation of defluorinated phosphates and, more particularly, to a process for producing a defluorinated phosphate useful as an animal feed ingredient from triple superphosphate or a mixture of phosphate rock and phosphoric acid.

Triple superphosphate is a concentrated phosphate produced by treating finely ground phosphate rock with phosphoric acid in predetermined proportions. The resultant mass is permitted to set and is cured in large storage piles. The main phosphate ingredient in triple superphosphate is hydrated monocalcium orthophosphate.

The high fluorine content of most of the commercially exploited natural deposits of phosphates in the world, which may be as high as 3.8% by weight of fluorine or even higher, renders triple superphosphate produced therefrom unsuitable for use as an animal feed. When these mineral phosphates are used to manufacture triple superphosphate, the fluorine carries over into the product, and detrimental effects are caused by the continued feeding of significant amounts of fluorine to animals over a period of time. It is, therefore, generally necessary to reduce the fluorine content of triple superphosphate and other phosphatic materials produced from phosphate rock to an acceptable level before they are suitable for use as an animal feed ingredient. In feed grade phosphates, the weight ratio of elemental phosphorus to fluorine, i.e., P/F weight ratio, is preferably greater than 50, and still more preferably greater than about 100.

The availability of phosphates used as animal feed ingredients is also an important factor. The phosphates are available when they are in a form in which they can best be assimilated by the animal. For animal feeds, calcium phosphates are preferably substantially 100% in the ortho form.

A number of processes have been suggested and used for the preparation of defluorinated phosphates from phosphate rock. These processes generally include mixing the phosphate rock with one or more of a variety of materials such as sulfuric acid, phosphoric acid, silica, limestone, soda ash, and the like, and calcining the mixtures to drive off fluorine.

One of the patents teaching the use of calcination is Malley et al., U.S. Pat. No. 3,101,999. In the process of this patent, triple superphosphate is initially heated at a temperature between 1050° and 1300° F. to effect a reduction in its fluorine content. The defluorinated phosphate mixture is then mixed with an alkaline material such as calcium oxide and heated to a temperature from 1800° to 2000° F. to yield a nutritionally available animal feed phosphate of low fluorine content.

Another patent, U.S. Pat. No. 2,565,351 of Butt, discloses that an animal food supplement of acceptable fluorine content and containing substantially all of the phosphate in the ortho form can be produced by treating ground phosphate rock with phosphoric acid in the amount such that in the end product the mole ratio represented by the formula:

$$\frac{\text{Moles}}{\text{Moles}} = \frac{CaO + MgO + Na_2O + K_2O - SO_3 - F_2}{P_2O_5 - Fe_2O_3 - Al_2O_3}$$

is between 2.7 and 3.1, and calcining the mixture at a temperature of at least 1150° C.

There are also a number of other processes for producing phosphatic feed materials depending upon a balance between the $P_2O_5$ content and other components of the final product such as determined by utilizing the formula of the aforementioned Butt patent. For example, Richardson's U.S. Pat. No. 2,893,834 is directed to a process wherein finely-divided phosphate rock is mixed with phosphoric acid and soda ash in amounts such that in the final product the mole ratio determined by the foregoing formula is between 2.5 and 3.8. The mixture is calcined between 1900° and 2700° F. in the presence of water, and the calcined product is quenched before its temperature falls below 1900° F.

Still another process is disclosed in U.S. Pat. No. 3,292,995 of Allen. This process utilizes phosphate rock, an alkali metal salt and calcium carbonate, which is mixed with the phosphoric acid to neutralize its free $SO_3$ content before the acid is blended with the rock and alkali metal salt. The components are mixed in proportions to produce a final product having a mole ratio determined by the foregoing formula between 2.5 and 3.8. The admixture is then calcined at a temperature between 2500° and 2800° F. to produce a highly acceptable animal feed supplement.

These and other processes which have been suggested for the production of animal feed materials from mineral phosphates are not entirely satisfactory. For example, many of the processes accomplish reduction of the fluorine content of the phosphate being treated at the sacrifice of availability of $P_2O_5$. Still other processes such as Malley, et al. require a two-stage heat treatment between which the phosphate material must be removed from the kiln for chemical treatment. A still further disadvantage of the Malley, et al. process is that the phosphate product has such a low bulk density that it is too difficult to handle to be commercially practical. Other processes in order to obtain commercially feasible reaction rates must operate at higher temperature ranges which require excessive fuel consumption and more expensive calcining equipment than is normally found in a fertilizer and animal feed ingredients plant.

SUMMARY OF THE INVENTION

This invention is based on the discovery of an improved process for producing a phosphate animal feed ingredient at relatively low temperatures. In accordance with the process of this invention, an animal feed ingredient is prepared from triple superphosphate, or a combination of phosphate rock and phosphoric acid, by initially mixing the same with a volatile anion alkali metal compound, e.g., sodium hydroxide, and a volatile anion calcium compound, e.g., limestone, which is primarily calcium carbonate. This combination of materials is mixed in amounts such that the process feed has a $CaO/P_2O_5$ mole ratio in the range of from about 2.20 to about 2.25, and an alkali metal oxide to $P_2O_5$ mole ratio in the range of from about 0.65 to about 0.70. The mixture thus formed is then calcined at a temperature of from about 2250° to about 2650° F. while it is being actively agitated in contact with a gaseous atmosphere containing at least about 5% water vapor. The fluorine content of the calcined product is less than the maximum permitted by the industry, i.e., the elemental P/F weight ratio is over 100, and there is excellent availability of the phosphate content of the product.

Without intending to limit the invention in any way it is believed that the theory upon which this method of fluorine elimination is based is that the fluorapatite content of the phosphate rock, $Ca_{10}(PO_4)_6F_2$, is first decomposed by the phosphoric acid in the manufacture of the triple superphosphate used as feed, or by its reaction with the phosphoric acid in the alternate method of preparation. These calcium and phosphate values then react with the alkali and alkaline earth values added to form a calcium-sodium-phosphate complex having the formula of $Ca_6Na_3(PO_4)_5$. This compound which can form at temperatures as low as 1200° F. prevents the reformation of fluorapatite. Thus, it is believed that the final fluorine evolution takes place from calcium and sodium silicofluorides and calcium fluoride instead of fluorapatite which requires the high defluorination temperatures usually found necessary in the art.

It is, therefore, a primary object of this invention to provide a process for producing a phosphate feed ingredient.

Another object of this invention is to provide a process for preparing a defluorinated animal feed material without sacrifice of availability of the phosphate content thereof.

Still another object of this invention is to provide a process utilizing relatively low temperatures for preparing phosphate animal feed material.

A further object of this invention is to provide a process for producing an animal feed material from triple superphosphate or a combination of phosphate rock and phosphoric acid.

These and further objects of this invention will become apparent or be described as the description thereof herein proceeds.

DESCRIPTION OF THE PREFERRED EMBODIMENTS

Basically the process of this invention is one wherein triple superphosphate, a volatile anion alkali metal compound and a volatile anion calcium compound are mixed in amounts such that in the final product certain mole ratios which are determined in accordance with formulas hereinafter described are within the stated ranges, and the mixture is calcined under carefully controlled conditions to yield a highly satisfactory animal feed ingredient.

It is also possible to prepare the same animal feed ingredient by employing, in lieu of triple superphosphate, a combination of phosphate rock and phosphoric acid, the materials used in the preparation of triple superphosphate, by combining the same with the volatile anion alkali metal and calcium compounds. When a combination of phosphate rock and phosphoric acid are utilized in the process of this invention, it is still necessary to add all of the materials in amounts such that in the final product the mole ratios are within the same ranges hereinafter given for when triple superphosphate is employed. The quantity of phosphoric acid used will be at least sufficient to decompose substantially all of the fluorapatite content of the phosphate rock used in this method. Therefore, the ratio of phosphoric acid to phosphate rock will be essentially the same as used in the manufacture of triple superphosphate in accordance with any of the processes well known in the art such as described in Chapter 8 of "Chemistry and Technology of Fertilizers," published by Reinhold Publishing Corp. in 1960.

Phosphate rock, if used in combination with phosphoric acid, is preferably finely ground, as for example, so that at least 85% is capable of passing through a 200 mesh screen (Tyler standard). Less finely ground material may be used, but the subsequent acidulation and calcination operations will generally require a longer time to achieve the desired results. The size of triple superphosphate used in the process of this invention is not critical. The triple superphosphate may be of any of the usual commercial products such as produced in accordance with one of the methods of the art.

In instances where phosphoric acid is utilized in combination with phosphate rock, the acid will be either of the so-called furnace acid or wet process phosphoric acid. It may be of any convenient dilution, for example, from about 25% to about 40% $P_2O_5$, but acids of lower and higher concentrations may also be used. Wet process phosphoric acid will generally be used since it is less expensive than furnace acid.

One of the prime considerations in determining the quantities of the different materials to be used in the process of this invention is the amount of the volatile anion calcium compound employed in relation to the phosphate content of the final product. The calcium compound and phosphatic material, namely, the triple superphosphate or phosphate rock and phosphoric acid, must be used in relative amounts so that the process feed has a $CaO/P_2O_5$ mole ratio from about 2.20 to about 2.25.

The alkali metal content relative to the phosphate content of the calciner feed mixture also has a marked effect upon defluorination and the availability of the phosphate content of the final product. It has been found that the addition of a suitable volatile anion alkali metal compound to give in the process feed an alkali metal oxide/$P_2O_5$ mole ratio, e.g., $Na_2O/P_2O_5$ mole ratio, within the range of from about 0.65 to about 0.70 will produce a superior animal feed material with respect to fluorine content and phosphate availability.

For the purpose of this application volatile anion alkali metal compounds and alkaline earth metals are intended to include those compounds having anions which would be volatilized at the calcination temperatures of this invention to yield the respective cations for reaction in the mixture. Examples of suitable alkali metals which may be used in accordance with the process of this invention include sodium, potassium and lithium carbonates, sulfates, hydroxides, halides, e.g., chlorides, with sodium compounds being preferred. Sodium hydroxide is the most preferred alkali metal compound for use in the process of this invention. Calcium-bearing compounds which may be used include limestone, hydrated lime, quicklime and calcium sulfate.

Another factor having an effect on fluorine removal is the quantity of water vapor in the gaseous atmosphere during the calcining operation. It has been determined that a water vapor content in the gaseous atmosphere of at least about 5% is necesary to achieve the desired degree of defluorination and physical characteristics, e.g., size, of the calcined product. The components of the mixture supplied to the calciner and the combustion products of the calciner fuel will often contain sufficient moisture to achieve a water vapor content in the calciner within the aforementioned range. In these instances where the total moisture content of the calciner gases is insufficient, it may be readily supplemented by the separate addition of water in an amount to obtain a water vapor content level within the desired range.

The phosphatic starting material, i.e., triple superphosphate or combination of phosphate rock and phosphoric acid is mixed with volatile anion salts of alkali metals and alkaline earth metals in any suitable manner. However, when phosphate rock and phosphoric acid are used, they are generally premixed before being combined with the alkali metal and calcium-bearing reactants. As illustrative of a suitable manner of combining the materials for producing a phosphatic feed material in accordance with this invention, triple superphosphate or a combination of phosphoric acid and phosphate rock, is premixed with caustic and this mixture is introduced to the calcining operation while slowly adding limestone. A pug mill, drum tumbler, or other like suitable apparatus may be utilized for preparing the mixture to be introduced into the calcination operation in accordance with this invention. The quantities of components utilized in accordance with this invention may be varied so long as the mole ratios of the components of the ultimate product are within the ranges herein delineated.

Mixtures balanced to have the aforementioned mole ratios in the above ranges are fed to calciners such as rotary kilns where they are agitated while they are subjected to the heat treatment operation. In the calciner, the temperature of the mixture must be sufficiently high to volatilize fluorine, which is a minimum temperature of 2250° F. At the same time, the maximum temperature used during the calcining operation should be about 2650° F. to avoid melting and fusion of the content of the calciner. When operating at calcining temperatures in this range, the residence time of material passing through the kiln will be of the order of about 10 to about 60 minutes to assure sufficient defluorination and yield a product having a P/F weight ratio which is greater than 50, preferably greater than 100.

The following non-limiting examples will serve to fully illustrate the process of this invention.

EXAMPLE I

To 89.5 parts by weight of triple superphosphate of a particle size that 95% passes through a 10 mesh screen (Tyler Standard) was added 14.9 parts by weight of 50% aqueous sodium hydroxide and 35.8 parts by weight of limestone. This combination was thoroughly mixed by means of a pug mill and then calcined at a temperature of 2250° F. Water formed in the combustion of the calciner fuel was sufficient to attain the desired vapor content of the atmosphere. The product which was obtained from the calciner after a residence time of 20 minutes had a $CaO/P_2O_5$ mole ratio of 2.20 and a $Na_2O/P_2O_5$ mole ratio of 0.63. The P/F weight ratio of the final product was 168 and substantially all of the phosphate content thereof was in the form of orthophosphate.

EXAMPLE II

The importance of having the $CaO/P_2O_5$ and $Na_2O/P_2O_5$ mole ratios in the process feed mixture in the aforementioned ranges is shown by the following observations and analyses obtained in tests wherein the procedure of Example I was followed but the mole ratios were varied by changing the formulation:

| Feed mix | | Physical properties | P/F |
|---|---|---|---|
| $CaO/P_2O_5$ | $Na_2O/P_2O_5$ | | |
| <2.2 | <0.60 | Sticky in kiln—balled | <50 |
| >2.3 | <0.60 | Large ball formation | <50 |
| >2.3 | >0.60 | Mixture of small balls and some product size | <100 |
| 2.20-2.25 | >0.65 | Good product size | >100 |

Although this invention has been described in relation to specific embodiments, it will be apparent that obvious modifications may be made without departing from the scope thereof as defined by the appended claims.

I claim:

1. The process for producing an animal feed ingredient which comprises mixing a phosphatic material of the group consisting of comminuted triple superphosphate and a combination of comminuted phosphate rock and phosphoric acid, a volatile anion alkali metal compound and a volatile anion calcium compound in amounts such that in the mixture $CaO/P_2O_5$ mole ratio is from about 2.20 to about 2.25 and the alkali metal oxide/$P_2O_5$ mole ratio is from about 0.65 to about 0.70, and calcining the mixture at a temperature from about 2250° to about 2650° F. while actively agitating the same in contact with a gaseous atmosphere containing at least about 5% water vapor for a period of time sufficient to yield a product having an elemental P/F weight ratio over 50.

2. A process in accordance with claim 1 wherein said volatile anion calcium compound is limestone, hydrated lime, quicklime or calcium sulfate.

3. A process in accordance with claim 2 wherein said volatile anion alkali metal compound is an alkali metal carbonate, sulfate, halide or hydroxide.

4. A process in accordance with claim 3 wherein said volatile anion alkali metal compound is a compound of sodium, potassium or lithium.

5. A process in accordance with claim 4 wherein said volatile anion alkali metal compound is a sodium compound, and said calcining is continued for a period of time to yield a product having an elemental P/F weight ratio of over 100.

6. A process in accordance with claim 4 wherein said phosphatic material is triple superphosphate.

7. A process in accordance with claim 4 wherein said phosphatic material is a combination of comminuted phosphate rock and phosphoric acid.

8. A process in accordance with claim 7 wherein said phosphoric acid is a wet process phosphoric acid.

9. A process in accordance with claim 8 wherein said wet process phosphoric acid contains from about 25% to about 40% $P_2O_5$.

10. A process in accordance with claim 6 wherein said volatile anion alkali metal is sodium hydroxide, said volatile anion calcium compound is limestone, and said calcining is continued for a period of time to yield a product having an elemental P/F weight ratio over 100.

11. A process in accordance with claim 7 wherein said volatile anion alkali metal is sodium hydroxide, said volatile anion calcium compound is limestone, and said calcining is continued for a period of time to yield a product having an elemental P/F weight ratio over 100.

References Cited
UNITED STATES PATENTS

| | | | |
|---|---|---|---|
| 2,997,363 | 8/1961 | Williams | 99—2 CD |
| 3,101,999 | 8/1963 | Malley et al. | 99—2 CD |
| 3,058,840 | 10/1962 | Tynan | 99—2 CD |
| 3,292,995 | 12/1966 | Allen | 99—2 CD |
| 3,658,594 | 4/1972 | Geiersberger | 99—2 CD |

NORMAN YUDKOFF, Primary Examiner

C. P. RIBANDO, Assistant Examiner

U.S. Cl. X.R.

426—74, 220, 807; 423—301

UNITED STATES PATENT OFFICE
CERTIFICATE OF CORRECTION

PATENT NO. : 3,851,086
DATED : November 26, 1974
INVENTOR(S) : Arthur N. Baumann It is certified that error appears in the above-identified patent and that said Letters Patent are hereby corrected as shown below:

In the Specification

Column 4, line 35, after "metal" insert -- and calcium and delete "and alkaline earth metals".

Column 4, line 66, delete "alkaline earth metals" and substitute -- calcium --.

Signed and Sealed this seventh Day of October 1975

[SEAL]

Attest:

RUTH C. MASON
Attesting Officer

C. MARSHALL DANN
Commissioner of Patents and Trademarks